United States Patent
Neiser et al.

(10) Patent No.: US 7,549,527 B2
(45) Date of Patent: Jun. 23, 2009

(54) SORTATION CONVEYOR

(75) Inventors: Raymond R. Neiser, Mason, OH (US); Justin J. Zimmer, Mason, OH (US); Martin A. Heit, Mason, OH (US); Allen C. Brown, Mason, OH (US)

(73) Assignee: Intelligrated, Inc., Mason, OH (US)

( * ) Notice: Subject to any disclaimer, the term of this patent is extended or adjusted under 35 U.S.C. 154(b) by 22 days.

(21) Appl. No.: 12/014,822

(22) Filed: Jan. 16, 2008

(65) Prior Publication Data

US 2008/0149459 A1    Jun. 26, 2008

Related U.S. Application Data

(62) Division of application No. 10/800,070, filed on Mar. 12, 2004, now Pat. No. 7,516,835.

(60) Provisional application No. 60/454,078, filed on Mar. 12, 2003.

(51) Int. Cl.
    *B65G 47/46* (2006.01)
(52) U.S. Cl. .................................. 198/370.02
(58) Field of Classification Search ............ 198/370.01, 198/370.02, 370.07
    See application file for complete search history.

(56) References Cited

U.S. PATENT DOCUMENTS

| | | | |
|---|---|---|---|
| 790,779 A | 5/1905 | Alvey | |
| 883,297 A | 3/1908 | Courtney | |
| 958,004 A | 5/1910 | Phelan | |
| 1,890,753 A | 12/1932 | Scheurer | |
| 2,100,423 A | 11/1937 | Ziegler | |
| 2,145,475 A | 1/1939 | Cook | |
| 2,837,447 A | 5/1958 | Gmur | |
| 3,101,829 A | 8/1963 | Silver | |
| 3,532,201 A | 10/1970 | McConnell | |
| 4,711,341 A * | 12/1987 | Yu et al. | 198/370.02 |
| 4,732,259 A | 3/1988 | Yu et al. | |
| 4,817,779 A * | 4/1989 | Beck et al. | 198/370.02 |
| 4,884,677 A * | 12/1989 | Yu et al. | 198/370.02 |
| 5,027,939 A | 7/1991 | Kilper et al. | |
| 5,033,600 A | 7/1991 | Klein | |

(Continued)

FOREIGN PATENT DOCUMENTS

DE    3725113    9/1988

(Continued)

OTHER PUBLICATIONS

U.S. Appl. No. 60/428,366, filed Nov. 22, 2002, Heit et al.

(Continued)

*Primary Examiner*—James R Bidwell
(74) *Attorney, Agent, or Firm*—Frost Brown Todd LLC

(57) ABSTRACT

A sortation conveyor has a divert guide path which is configured to guide pushers to engage articles disposed on an endless conveying surface at an initial impact which does not result in an out of control situation even at high speeds. The divert guide path is disposed at a plurality of divert angles, and guides pushers to engage articles at a low initial contact divert angle and first lateral speed and to accelerate the articles to a final divert angle and second, higher, lateral speed. The pushers may be undergoing lateral acceleration at the time initial contact is made with the articles.

18 Claims, 12 Drawing Sheets

U.S. PATENT DOCUMENTS

| | | |
|---|---|---|
| 5,070,987 A | 12/1991 | Koltookian |
| 5,086,910 A | 2/1992 | Terpstra |
| 5,127,510 A | 7/1992 | Cotter et al. |
| 5,131,522 A | 7/1992 | Fujio |
| 5,191,959 A | 3/1993 | Leemkuil |
| 5,213,189 A | 5/1993 | Agnoff |
| 5,217,105 A | 6/1993 | Sapp et al. |
| 5,333,715 A | 8/1994 | Sapp |
| 5,375,689 A | 12/1994 | Sapp et al. |
| 5,427,223 A | 6/1995 | Van den Goor |
| 5,456,347 A | 10/1995 | Best et al. |
| 5,490,587 A | 2/1996 | Fisher |
| 5,562,195 A | 10/1996 | Isaacs |
| 5,613,591 A * | 3/1997 | Heit et al. .............. 198/370.02 |
| 5,642,799 A | 7/1997 | Warrilow |
| 5,732,814 A * | 3/1998 | Owczarzak et al. ......... 198/890 |
| 5,901,827 A | 5/1999 | Belz et al. |
| 5,927,465 A | 7/1999 | Shearer, Jr. |
| 5,967,289 A | 10/1999 | Kelsey |
| 6,041,909 A * | 3/2000 | Shearer, Jr. ............ 198/370.02 |
| 6,139,240 A | 10/2000 | Ando |
| 6,390,274 B1 | 5/2002 | Snedecor |
| 6,419,073 B1 | 7/2002 | Piron |
| 6,513,642 B1 * | 2/2003 | Shearer et al. ......... 198/370.02 |
| 7,055,669 B2 | 6/2006 | Veit |

FOREIGN PATENT DOCUMENTS

| | | |
|---|---|---|
| FR | 2 530 590 | 1/1984 |
| WO | WO 03/037761 | 8/2003 |

OTHER PUBLICATIONS

U.S. Appl. No. 60/445,974, filed Feb. 7, 2003, Heit et al.
U.S. Appl. No. 60/454,078, filed Mar. 12, 2003, Neiser et al.
U.S. Appl. No. 10/409,749, filed Apr. 9, 2003, Boulais et al.

* cited by examiner

SORTATION CONVEYOR

This application claims priority from U.S. patent application Ser. No. 10/800,070, filed Mar. 12, 2004, now U.S. Pat. No. 7,516,835, titled Sortation Conveyor and from U.S. Provisional Patent Application Ser. No. 60/454,078, filed Mar. 12, 2003, titled Sortation Conveyor, the disclosure of which is incorporated herein by reference. This application also incorporates by reference the disclosures of U.S. patent application Ser. No. 10/409,749, filed Apr. 8, 2003, titled Sortation System Pusher, U.S. Provisional Patent Application Ser. No. 60/445,974, filed Feb. 7, 2003, titled Slat Sortation Conveyor; and U.S. Provisional Patent Application Ser. No. 60/428,366, filed Nov. 22, 2002, titled Pusher For Sortation System.

BACKGROUND OF THE INVENTION

This invention relates to a sortation conveyor with pusher shoes which travel laterally (transverse to the longitudinal direction of travel of the sortation conveyor) to divert articles carried by the upper conveying surface of the sortation conveyor to diverts, and more particularly to a sortation conveyor in which the pushers are guided along divert guide paths so as to gently engage and gradually accelerate conveyed articles, such as cartons, laterally onto the diverts. The invention will be disclosed in connection with, but not limited to, a sortation system which includes a divert guide path guide track, with an arcuate section, configured to produce gentle initial contact between the pushers and conveyed articles followed by gradual acceleration.

It is believed that a sortation conveyor constructed in accordance with the teachings of the present invention may effectively be operated at high speeds, such as 650 feet per minute and higher, including for example, 700 feet per minute, 800 feet per minute, 1000 feet per minute and possibly even higher, having a variable throughput rate based on carton length and gaps, while maintaining control of the conveyed articles without cartons rotating substantially beyond the final divert angle, toppling or otherwise upsetting the articles. Sortation conveyors constructed in accordance with the teachings of the present invention may also be operated at lower speeds with improved control. Such improved control results in a higher percentage of articles being successfully diverted when utilizing the teachings of the present invention in comparison to when utilizing the teachings of the prior art.

BRIEF DESCRIPTION OF THE DRAWINGS

The accompanying drawings incorporated in and forming a part of the specification illustrate several aspects of the present invention, and together with the description serve to explain the principles of the invention. In the drawings.

Reference will now be made in detail to an embodiment of the invention, an example of which is illustrated in the accompanying drawings.

DETAILED DESCRIPTION OF AN EMBODIMENT OF THE INVENTION

Figure 1:
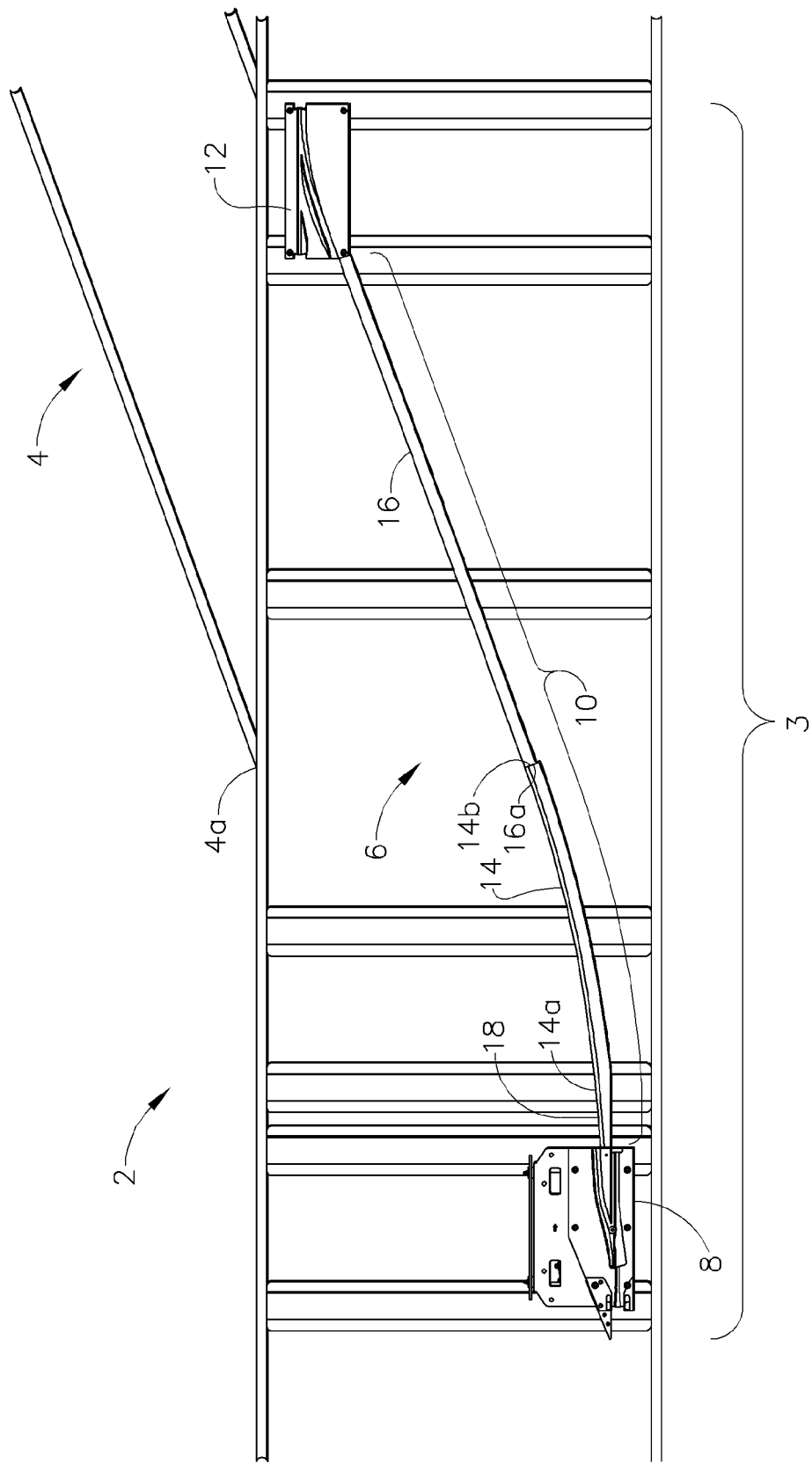
FIG. 1 is a plan view of a portion of a sortation conveyor constructed according to the present invention, with the conveying surface and pushers omitted so as to show the divert guide track and switch assembly.

Referring now to the drawings in detail, which depict an exemplary embodiment of the present invention, wherein like numerals indicate the same elements throughout the views, FIG. 1 is a plan view of a portion of a sortation conveyor, generally indicated at 2, showing a divert location constructed according to the present invention, with the endless conveying surface and the pushers carried by the endless conveying surface of the sortation conveyor omitted so as to show the switch assembly 8, divert guide track 10 and return 12. Conveyor 2 includes divert location 3, with divert 4 aligned thereat to receive articles which are selectively diverted to divert 4 by sortation conveyor 2 at divert location 3. As used herein, divert location refers to a section of a conveyor whereat an article is directed from the conveyor and discharged transversely onto to a divert. Divert 4 may be any receiving means, such as a powered or non-powered conveyor, a chute, a hopper, a bag or a bin. Each divert 4 has at least one associated transverse divert guide path 6, upstream of reentry block 12. Sortation conveyor 2 includes one or more diverts and associated divert guide paths.

As shown, divert guide path 6 is at least partially defined by divert guide track 10, which in the embodiment depicted includes arcuate section 14 and straight section 16. Divert guide track 10 is disposed downstream of the associated corresponding switch assembly 8, meaning that divert guide track 10 receives the guiding elements of the pushers diverted at switch assembly 8 and are therefore guided by divert guide track 10. The associated reentry 12 is downstream of divert guide track 10 and switch assembly 8. In the depicted embodiment, divert guide path 6 includes straight section 18 with arcuate section 14 disposed downstream thereof The present invention may be practiced without straight section 18 upstream of arcuate section 14.

In the depicted embodiment, arcuate section 14 forms 17° of a circular arc (from 3° to 20° relative to the longitudinal downstream direction of travel) with a 15 foot radius for the 20° divert 4, although the present invention is not limited to this dimension, nor to a constant radius arc, nor to the total angle of the arc, nor to the starting or ending angles of the arc. As is well known, the radius of a point on a non-constant radius arc is also referred to as the radius of curvature. For example, an arc with a 12 foot radius may be used with a 20° divert, or an arc with an 8 or 10 foot radius may be used with a 30° divert. A larger radius is generally better, but the larger the radius, the more space required for the sortation system. An arcuate section 14 having a radius ranging from 12 inches to 180 inches and up (space allowing) can provide improved control during carton divert, including, but not limited to, at speeds below the high speeds at which the present invention may be advantageously used. Arcuate section 14 may be alternatively configured to define a parabolic shape or a complex curve.

It is noted that, without departing from the teachings of this invention, the same result as a smooth arc may be obtained by a series of relatively short straight sections disposed end to end, non-colinear to each other, which it is noted is essentially the nature of any curved surface at its basic level, and such configuration is considered to be arcuate. Arcuate section 14 defines an arcuate divert guide path portion which distributes the force necessary to rotate and laterally accelerate articles toward divert 4 over a longitudinal and lateral distance instead of an abrupt initial force being applied to the article being diverted as the result of the pusher elements moving transversely at the final divert angle or a large divert angle when the article is initially contacted. Thus, a reduced force is applied to rotate and laterally accelerate each carton, applied over a longer time and distance.

In the embodiment depicted, divert guide path 6 comprises a plurality of divert angles. The divert angle at any point along a pusher's path is the angle of a line tangent to the pusher's path at that point measured relative to the longitudinal downstream direction. Thus, for any point along divert guide path 6, the divert angle is the angle of a line tangent to the divert guide path at that point measured relative to the longitudinal downstream direction. The final divert angle is the angle at which the pushers are traveling when articles are essentially discharged from the sortation conveyor (prior to entering reentry 12). A carton under control is discharged at the final divert angle. Usually the angle of a divert adjacent the divert location is the same as the final divert angle, but such is not a requirement of this invention. Divert 4 may be disposed at an angle different from the divert angle of section 16. Typical final divert angles include 20° and 30°, which are referred to as 20° and 30° diverts, respectively. Divert guide track 10 includes straight section 18, disposed at a constant divert angle of 3°. In the depicted embodiment, the divert angle of section 18 matches the divert angle of exit section 8g, which will be described below. As shown, sections 14 and 18 are formed from a single piece, with the divert angle of entrance 14a of section 14, in the depicted embodiment preferably matching the divert angle of upstream straight section 18. In the embodiment depicted, entrance 14a is disposed at a 3° divert angle, matching the 3° divert angle of section 18. Exit end 14b of section 14 preferably matches the divert angle of straight section 16, and in the embodiment depicted is disposed at a 20° divert angle matching the divert angle of straight section 16. Arcuate section 14 thus comprises a plurality of divert angles. Divert guide track 10, and divert guide path 6, comprises a plurality of divert angles: that of straight section 18, those of arcuate section 14 and that of straight section 16.

Straight section 16 defines the final divert angle and may be disposed at any suitable angle, such as 20° or 30°, as is well known, with exit end 14b preferably matching the final divert angle. It is noted that entrance 16a of section 16 is approximately aligned with the intersection 4a of divert 4 with conveyor 2. Although not required, this configuration is believed preferable as it allows the divert's throat width to be maintained. It is preferred, but not required, that exit end 14b of arcuate section 14 not extend past a line, perpendicular to section 16, passing through intersection 4a.

Figure 2:
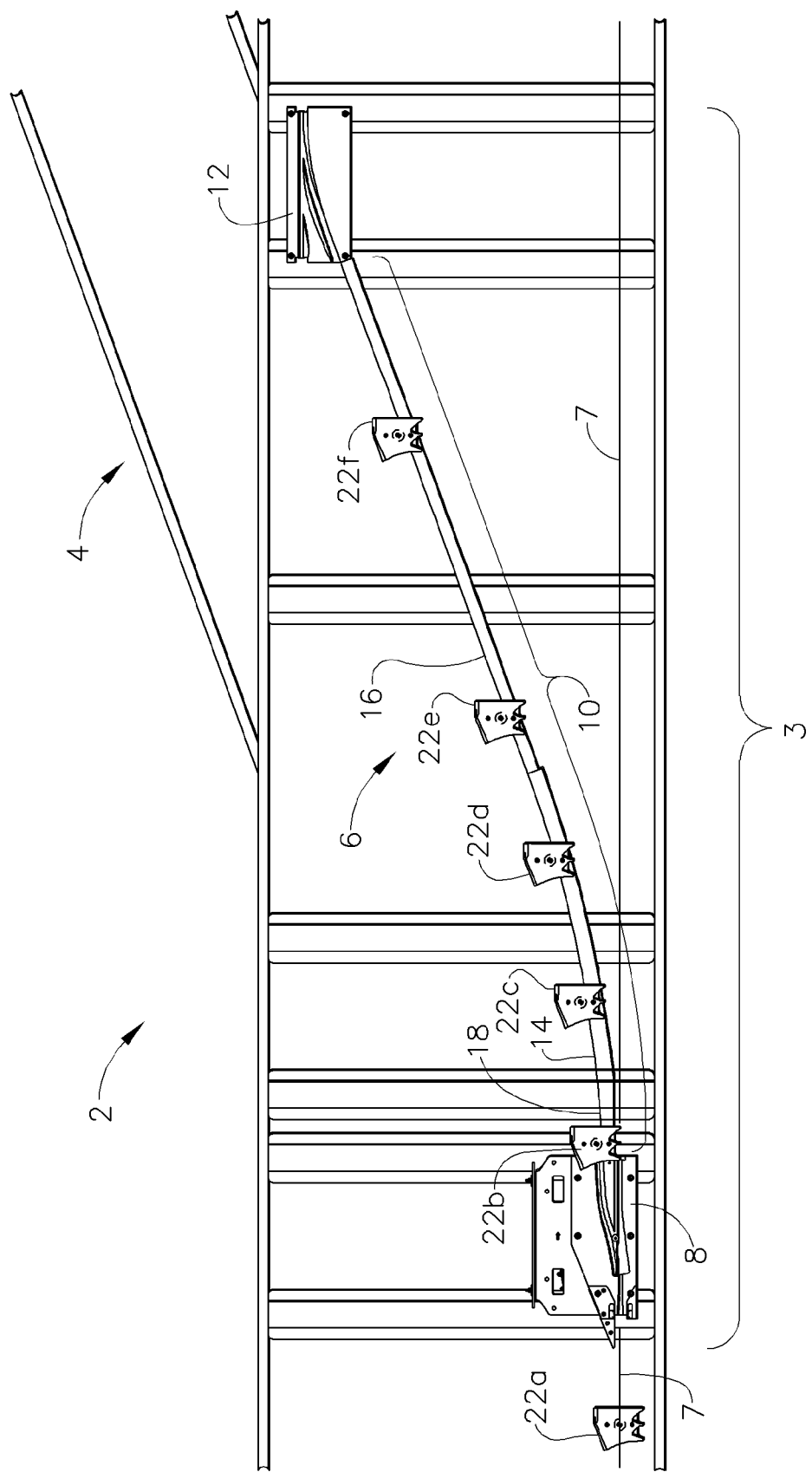
FIG. 2 is a plan view of the portion of the sortation conveyor shown in FIG. 1, except that a plurality of pushers are illustrated at various locations along the divert guide track. The pushers illustrated are not adjacent to each other.

FIG. 2 is similar to FIG. 1, with a plurality of pushers 22a-f illustrated at various locations along the divert guide path. Pushers 22a-f are not adjacent to each other and diverted pushers therebetween have been omitted for clarity. Pusher 22a is illustrated traveling along the home or charge path indicated generally by line 7. Unless diverted at switch assembly 8, pusher 22a travels along the home path downstream of switch assembly 8. Pusher 22b has been diverted and is traveling along straight section 18. Pushers 22c and 22d are traveling along arcuate section 14. As illustrated, pusher 22c is traveling at a lower divert angle than pusher 22d. Pushers 22e and 22f are traveling along straight section 16, at the final divert angle. As is well known, the set of diverted pushers for carton 20c may include additional pushers (not shown) between pushers 22d and 22e, as well as pushers located upstream and/or downstream thereof, or may just include the two pushers 22d and 22e illustrated. Since pusher 22d is traveling along arcuate section 14, some pushers in between pushers 22d and 22e are likely bridged.

By the time a pusher reaches reentry 12, the action of the pusher on the article is essentially complete, and the combination of the location and configuration of divert 4, the article's lateral speed, and the action of any pushers still acting on the article, will result in the article traveling onto divert 4 to complete the divert. Herein, reentry 12 is not considered part of the divert guide path.

Figure 5:
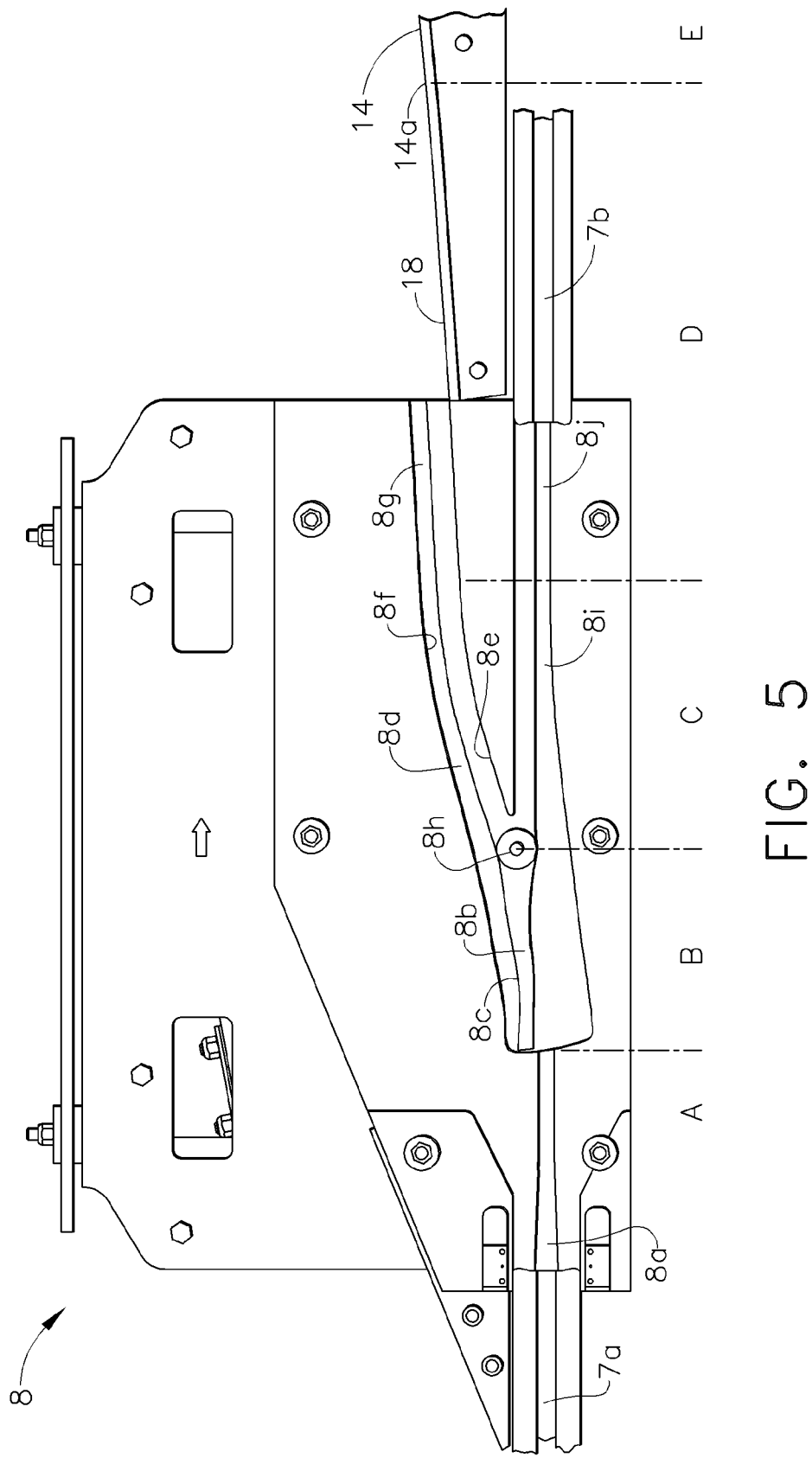
FIG. 5 is an enlarged, fragmentary view of the switch assembly and the leading end of the divert guide track of the sortation conveyor of FIG. 1.
Figure 6:
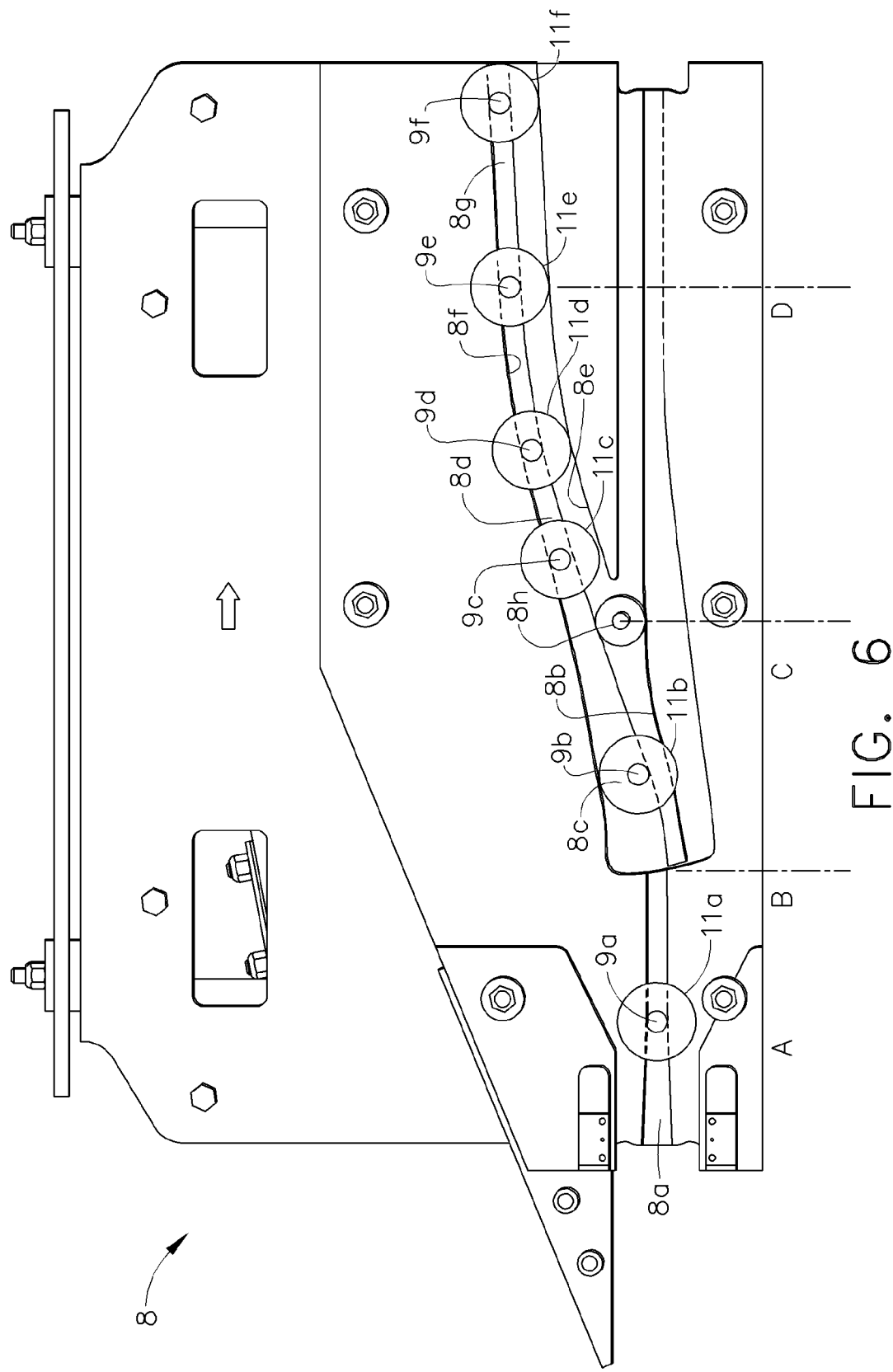
FIG. 6 is an enlarged view of the divert switch assembly showing the pusher pin and bearing/cam traveling through the switch guide path.
Figure 7:
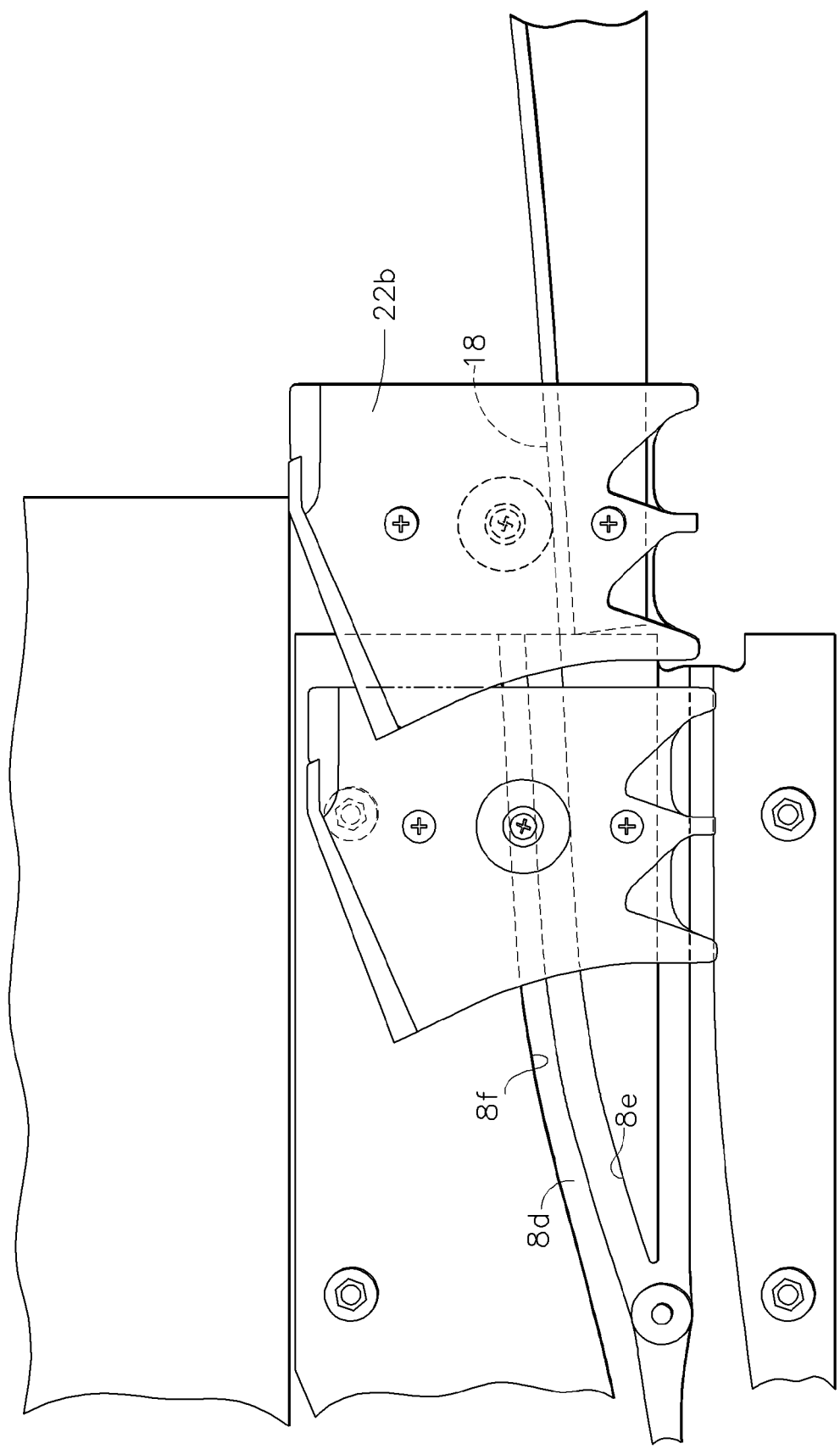
FIG. 7 is an enlarged, fragmentary view of a portion of the switch assembly and the leading end of divert guide track shown in FIG. 5, with two pushers shown.

Referring specifically to FIGS. 5, 6 and 7, switch assembly 8 functions, through switch blade 8b, also referred to as switch 8b, to selectively direct one or more pushers (not shown in FIG. 5) from the pusher charge or home path to the divert guide path 6. The present invention may be practiced with any type of switching device regardless of how the selective diverting of the pusher elements is accomplished, including but not limited to mechanical switching or a magnetic device. Switch assembly 8 defines a switch guide path, which includes entry path 8a, surface 8c defined by switch 8b, section 8d, and exit section 8g. Entry path 8a is aligned with home path guide 7a, and receives the guide pin of the pusher as the pusher reaches switch assembly 8. Switch assembly 8 includes rotatable switch 8b, which may be rotated about pivot 8h from a first position, as shown in FIG. 5, at which pushers are not diverted, to a second switching position, at which pushers are diverted. Unless diverted, a pusher will continue along the home path, with the guide pin traveling through switch assembly 8 past switch 8b along switch home path 8i, past switch home path exit 8j to home path guide 7b.

The switching function of switch assembly 8 is complete at the downstream end of switch 8b. By way of example, the divert function of a magnetic switch may be completed once the pusher has reached the point at which the pusher would continue to the divert guide path if the magnetic force of the magnetic switch on the pusher ceased.

Switch 8b includes surface 8c, the leading end of which, when switch 8b is disposed in the divert position, is at a nearly 0° divert angle, measured relative to the longitudinal downstream direction, leading through a small radius to the other end of surface 8c which is disposed at a 20° angle, also measured relative to the longitudinal downstream direction. When in the second position, the pusher pin is very quickly guided from 0° to 20° to begin the movement of selected pushers to the divert guide path. As is well known, switch 8b must be capable of rotating into and out of the switching position between the guide pins of adjacent pushers, which, in the exemplary embodiment are located on 5 inch centers. As is well known, this switching must occur in a very short time period.

FIG. 6 illustrates the progression of pusher pin 9 and bearing, or cam, 11, with the different positions denoted by a letter suffix. Pin 9a and cam 11a are illustrated in entry path 8a, where the switch guide path is guiding the pusher through pin 9a. At switch 8b, surface 8c guides pin 9b out of home path 7.

Switch assembly 8 is designed such that cam 11 may contact surface 8e at about the location of the lead line from the numeral 8e. However, due to chatter, oscillations and the lateral momentum of the pusher, cam 11 may contact surface 8e at the end of zone C or slightly into zone D. Thus, in zone C, surface 8f may act on pin 9c, which is after the pusher has reached its maximum divert angle in switch assembly 8, and concomitantly its maximum lateral speed, being decelerated by surface 8f acting on pin 9c. Cam 11f is being guided by surface 8e.

Thus, switch assembly 8 is configured to divert pushers from a home path by switch 8b. In doing so, the pushers travel at an initial divert angle, starting from 0° in the depicted embodiment, up to an intermediate divert angle, 20° in the depicted embodiment, and back down to an exit divert angle, 3° in the depicted embodiment. The intermediate angle may be any suitable angle which allows for proper diverting of the pushers. The exit divert angle may also be any suitable angle, such as approximately half of the intermediate angle, 10° or less, 5° or less, 3° or less, or zero or less. Thus, prior to contact between a pusher and an article being diverted, the pusher is accelerated to a first lateral speed, and then decelerated to a substantially lower second lateral speed. In the depicted embodiment, the second lateral speed matches the lateral speed of the pushers traveling along straight section 18, both being a 3° divert angle. In the embodiment depicted, the pushers are accelerated to a first lateral speed of 237 feet per minute at 20° and then decelerated to a second lateral speed of 34 feet per minute at 3°.

In the depicted embodiment, section 8d begins at 20°, measured relative to the longitudinal downstream direction, preferably matching the exit angle of switch 8b, and guides the pushers back to a reduced angle of 3°, measured relative to the longitudinal downstream direction. In this zone, section 8d acts on the pin through surface 8f, as the pusher's angle of travel is reduced. Alternatively, to avoid the wear on surface 8f due to the pin travel adjacent thereto, a surface (not shown) may be included adjacent 8f to engage the pusher cam or bearing on that side of section 8d, instead of the pin or in addition to the pin. Switch assembly 8 includes surface 8e, which eventually engages the pusher cam or bearing without binding the pin as the pusher travels downstream toward exit section 8g.

In the depicted embodiment, exit section 8g is straight and disposed at a 3° divert angle, matching the end of section 8d and the entrance of section 18. If, as previously mentioned, arcuate section 14 is disposed immediately downstream of exit section 8g without straight section 18, the divert angle of exit section 8g would match, exactly or functionally approximate, the divert angle of entrance 14a.

Figure 4:
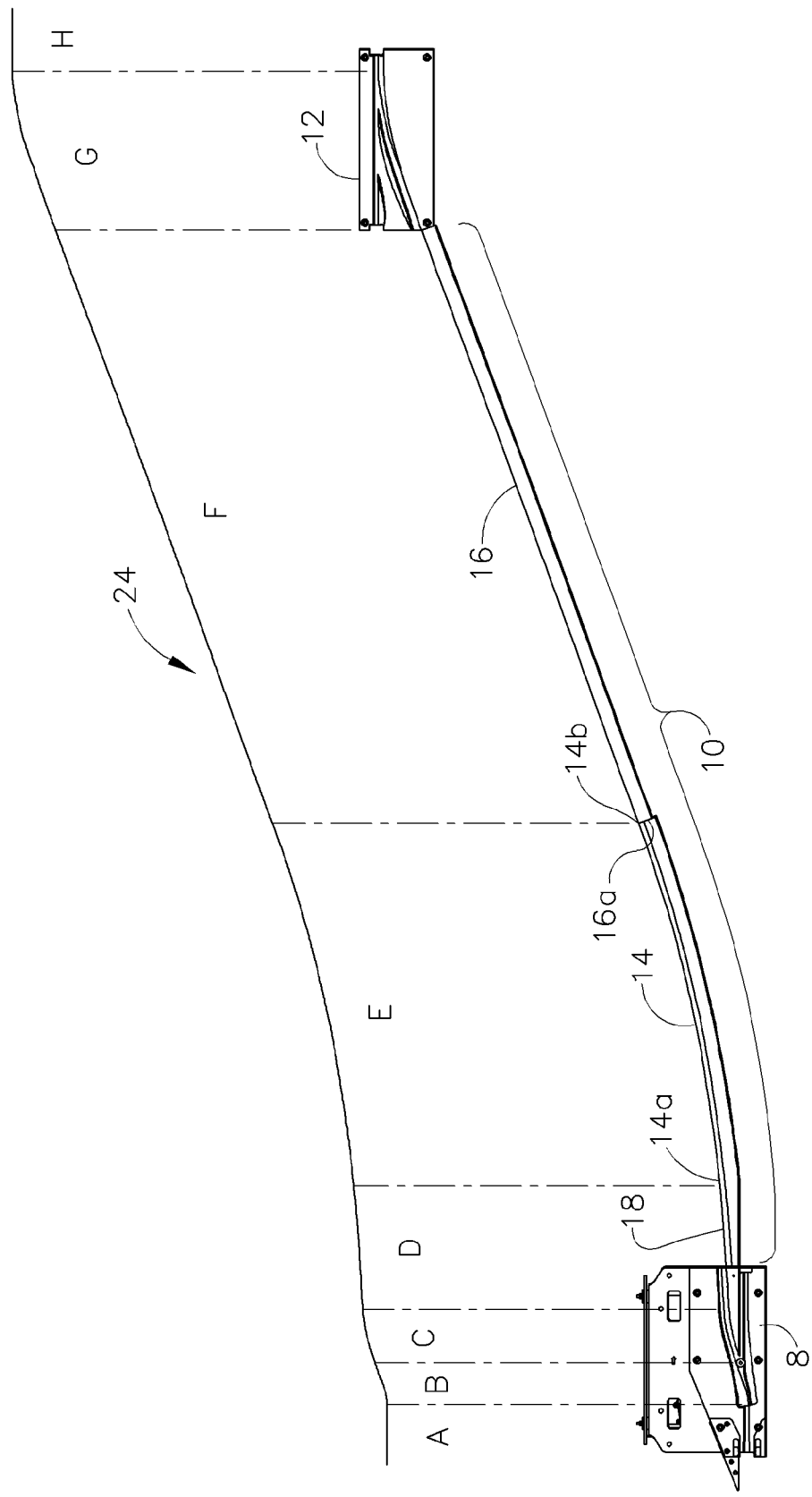
FIG. 4 illustrates the switch assembly and divert guide track of a sortation conveyor constructed in accordance with FIG. 1, and the profile of the path followed by a pusher.

FIG. 4 illustrates switch assembly 8 and reentry block 12, and divert guide track 10 of sortation conveyor 2. For additional clarity, FIG. 4 includes a projection, indicated generally at 24, of the profile of the path followed by a pusher traveling through the divert location shown in FIG. 4. In zone A, upstream of switch 8b, the pushers are traveling straight in the home or charge path. In zone B, sets of one or more pushers are selectively diverted from home path 7 by switch 8b, being guided on the pin from 0° to 20° through a small radius. In zone C, the angle is reduced from 20° to 3° relative to the longitudinal direction, the pushers being guided through as large a radius as feasible, given length constraints.

Figure 3:
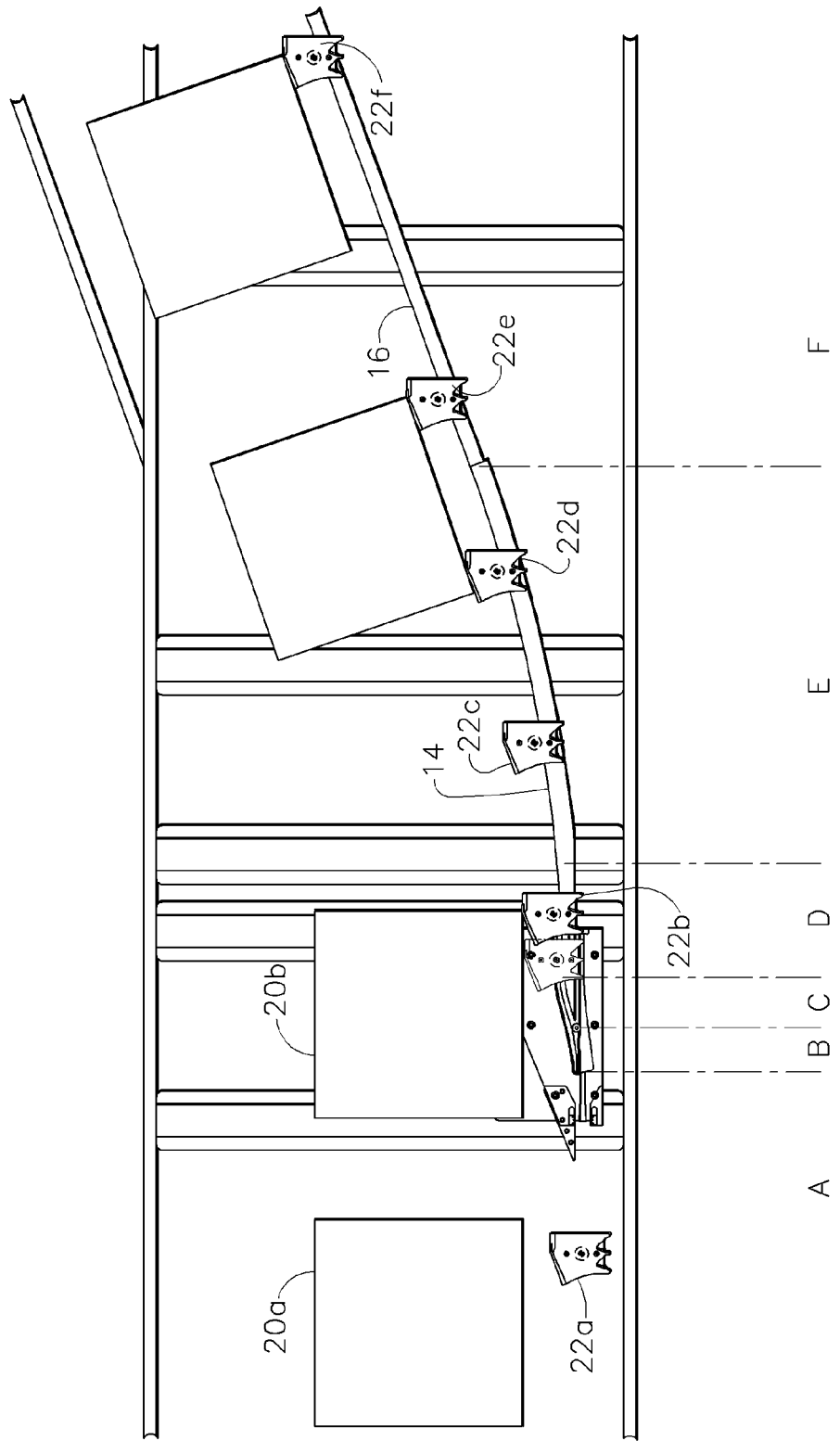
FIG. 3 is an enlarged, fragmentary view of the portion of the sortation conveyor illustrated in FIG. 1 with non-adjacent pushers and cartons, illustrating interaction between cartons and pushers at different stages during divert.

Up to this point, there preferably has been no contact with any articles on the conveying surface, with the pusher being primarily guided by its pin. As seen in FIG. 3, carton 20a is positioned to be spaced laterally away from the charge or home path of the pushers, the nearby pusher numbered 22a in FIG. 3. In the depicted embodiment, this distance is nominally 3 inches.

By the end of zone C, the pushers of the diverted set of pushers are close to but preferably do not contact the carton which is laterally aligned with the diverted set of pushers. Although it is possible that contact has occurred prior to zone D, the effectiveness of this invention might be limited if contact initiates within zone B or C.

In zone D, the initial contact between the diverted set of pushers and the carton being diverted is preferably made. Guide path Guidance of the pusher typically transitions from the pin to the cam by zone D, so that the cam, not the pin, transmits any force exerted by the pusher on the carton. Within this initial contact zone, the carton being diverted is initially contacted by at least one of the pushers of the diverted set of pushers. Usually the leading pusher is the initial pusher of the diverted set to contact the carton, as illustrated in FIG. 3 with initial contact being between pusher 22b and carton 20b. However, depending on the orientation and shape of the carton, the initial contact between the carton and the diverted set may occur by any pusher of the diverted set, or even by two or more pushers simultaneously or approximately simultaneously.

As previously mentioned, each carton is preferably positioned to the switch side of sortation conveyor 2, being single file and edge aligned such that the edge of the article is parallel to the longitudinal direction. Differently positioned cartons may limit the effectiveness: In the depicted embodiment, the system is designed for maximum effectiveness with articles being edge aligned and spaced a nominal distance of 3 inches from the edge of the pushers traveling along the home path.

There is an initial contact zone within which initial contacts between the set of diverted pushers and the articles being diverted are designed to occur. The divert guide path may be considered as beginning at the initial contact zone. Each divert guide path includes an initial contact zone portion which is disposed within the initial contact zone. The sortation conveyor is configured to position articles in a repeatable position, within a range, being edge aligned and spaced a nominal lateral distance from the pushers traveling along the home path. When articles are so positioned, the initial contact occurs within the initial contact zone. As a result of the variation in the lateral positioning of the articles, as well as the location along the edge of the carton at which initial contact is made, the initial contact zone extends laterally and longitudinally. It is noted that mispositioned articles, or articles without a straight side oriented toward the pushers, may be initially contacted by a diverted set of pushers outside of the initial contact zone. In the depicted embodiment, the contact zone falls within zone D, such as along straight section 18, with the divert angle of the pusher making initial contact being 3°. It is noted that within a linear portion of the divert guide path, the pushers have a constant lateral speed and thus no lateral acceleration.

The length and angle of zone D is calculated to produce initial engagement between the diverted pushers and the laterally aligned cartons being diverted within zone D. It is noted that the straight section of zone D may be omitted, with arcuate section 14 mating directly with exit section 8g, with the divert angle at which the initial pusher to contact the carton is traveling when it initially contacts the carton, also referred to as the initial contact divert angle, being low enough that the impact between the pushers and the cartons does not result in an out of control situation.

The initial engagement should preferably be as gentle as possible, such that the force with which the carton is contacted when divert of the carton is initiated is sufficiently low enough to maintain control throughout the entire range of longitudinal speeds at which the sortation conveyor operates. Cartons under control during divert reliably and repeatably reach the divert, and the cartons are reliably not rotated substantially beyond the final divert angle, upset or toppled. Control in a sortation system, configured according to the teachings hereof to maintain control of articles being diverted at high speeds, is determined by the articles for which the sortation system is used. A sortation system does not lack control at operating speeds because cartons for which the system is not designed, or cartons for which the system is not typically used, cannot be diverted under control. For example, the inability of a sortation conveyor constructed in accordance with the present invention to control unique cartons which are different from the cartons for which the sortation conveyor was designed or is used, does not mean that the sortation conveyor does not maintain control of articles being diverted. The measure of control is that of the articles for which the system is designed or used.

When the initial contact occurs while pushers are traveling along an arcuate path, the pusher is being laterally accelerated upon initial contact. The acceleration rate or rates of at least the first pusher of the diverted set of pushers to contact the carton being diverted must be sufficiently low enough to maintain control throughout the entire range of longitudinal speeds at which the sortation conveyor functions. The present invention is configured to minimize the maximum impact speed of the pushers with the cartons, resulting in a low initial impact force.

Any carton being diverted must be laterally accelerated from its zero lateral speed to its final lateral speed. Each carton being diverted by the present invention is laterally accelerated, whether initial contact occurs in a linear portion of the divert guide path where the pushers have no lateral acceleration, such as that defined by straight section 18, or in an arcuate portion of the divert guide path where the pushers are being laterally accelerated, such as that defined by arcuate section 14. It is noted that "chatter", minor fluctuations in lateral speed or lateral acceleration resulting from variation in longitudinal speed, tolerances and loading, are excluded from consideration.

Maintaining control, with the present sortation conveyor, of the cartons at high longitudinal speeds means that the carton being diverted is laterally accelerated at a rate or rates which are sufficiently low enough to maintain control throughout the entire range of longitudinal speeds at which the sortation conveyor functions.

For most cartons, initial contact by the first pusher to contact the carton will initiate angular rotation of the carton about a vertical axis, but at a minimum will result in transverse movement of at least a portion of the carton. In the present invention, this initial rotation will begin relatively slowly as a result of the initial contact divert angle of the pusher at the point of contact and the minimized initial impact speed and impact force.

The location of the vertical rotation axis typically varies from carton to carton, being dependant on many factors, and may not be constant through out divert for a particular carton. Following the initiation of rotation, continued engagement by the initial pusher will rotate the carton until another pusher initially contacts, and likely remains in contact with the carton. The first two pushers to contact the carton may not be adjacent, resulting in the carton bridging between the two pushers, with intermediate pushers not initially being in contact. It is noted that short cartons may not bridge. Oddly shaped cartons will also affect the initial contact of a diverted set and the occurrence of bridging.

Although bridging can occur even if the initial contact zone portion is linear and followed by a linear divert guide path, zone D is designed to generally have the initial contact and therefore initial impact of the pushers on the cartons occur within zone D, although some pushers may have initial contact within zone E or F, depending on bridging.

The divert angle of zone D functions to minimize lateral speed of pushers when they initially contact a carton. Even if bridging occurs, initial contact between a diverted set of pushers (the first contact by any of the diverted set) occurs at low lateral speed. The impact force results from the difference in lateral speed between the carton and the pushers: Since the cartons generally have no lateral speed prior to initiation of divert, the impact force generally is the result of only the lateral speed of the pusher.

Even if all of the diverted set of pushers in zone D are in engagement with the diverted carton by the time the leading pusher reaches the end of zone D, the diverted carton can bridge intermediate pushers within the diverted set in zone E with the arcuate divert guide path. Such bridging also occurs if the initial contact zone portion is arcuate.

In the embodiment depicted, the direction of travel of pushers traveling in zone E begins at 3° and ends at 20°. In zone E, the carton continues to be rotated, until the trailing edge of the carton reaches the end of zone E, at which location the rotation of the carton is completed, usually matching the final divert angle of straight section 16, which is 20° in the depicted embodiment. Arcuate section 14 causes the pushers to gradually, not necessarily constantly, rotate and laterally accelerate the cartons, producing low forces therebetween. The acceleration is preferably below 1 g, and in the depicted embodiment it is less than 0.3 g. Without being limited thereto, an arcuate section 14 that limits the lateral acceleration of pushers when in contact with cartons to less than 0.4 g will result in desirable improvement in control. By way of examples, an arcuate section with a 15 foot radius, having a final divert angle of 20°, operating at 650 feet per minute results in an average lateral acceleration of about 0.25 g, with a maximum lateral acceleration of about 0.277 g; an arcuate section with a 12 foot radius, having a final divert angle of 20°, operating at 650 feet per minute results in an average lateral acceleration of about 0.32 g, with a maximum lateral acceleration of about 0.347 g; an arcuate section with an 8 foot radius, having a final divert angle of 30°, operating at 650 feet per minute results in an average lateral acceleration of about 0.51 g, with a maximum lateral acceleration of about 0.62 g; an arcuate section with a 15 foot radius, having a final divert angle of 20°, operating at 630 feet per minute results in an average lateral acceleration of about 0.24 g, with a maximum lateral acceleration of about 0.26 g; an arcuate section with a 12 foot radius, having a final divert angle of 20°, operating at 630 feet per minute results in an average lateral acceleration of about 0.3 g, with a maximum lateral acceleration of about 0.33 g; and an arcuate section with a 8 foot radius, having a final divert angle of 30°, operating at 630 feet per minute results in an average lateral acceleration of about 0.48 g, with a maximum lateral acceleration of about 0.58 g.

The curved divert guide path allows for better controlled carton handling. While a large radius for arcuate section 14 is desirable, to take the pushers to their maximum lateral speed as gradually as possible, improvements from use of the present invention may be seen at a radius as small as one foot providing improved control at lower speeds.

The divert guide path defined by section 18, having a low divert angle, and arcuate section 14, distributes the force necessary to laterally accelerate articles over a longitudinal and lateral distance, instead of a large initial, almost instantaneous force being applied to the article being diverted as the result of the pusher elements moving transversely at the final divert angle or a large divert angle when the article is initially contacted. The energy to laterally accelerate the cartons is initially imparted to the cartons at a low lateral speed, and is imparted thereafter at increasing lateral speeds until the lateral speed of the cartons match the final divert lateral speed.

Within zone E, as the diverted set of pushers travels through the arcuate portion of divert guide path 6, the lateral speed of the diverted carton is increased, being laterally accelerated as the pushers in contact with the carton are accelerated from a first speed at which the carton was initially contacted to a second speed at the end of zone E, at which the divert angle of the end 14b of guide track 14 preferably is approximately tangent to the divert angle of straight section 16, which is the final divert angle at which the diverted carton is delivered to the divert. Within zone E, pushers which may be bridged therein, and thus not in contact with the carton, are also accelerated to the second speed at the end of zone E. Generally, all pushers of the diverted set within zone F will be in contact with the carton.

Throughout the length of the arcuate divert guide path defined by arcuate section 14, for a single radius arc, the lateral acceleration of pushers travelling therealong gradually increases until it instantaneously goes to zero when straight section 16 is entered at entrance 16a. The lateral speed and lateral acceleration profiles of such travel are graphically illustrated in FIGS. 8-11. As is well know, the lateral speed and lateral acceleration are the lateral vectors of the total velocity and total acceleration.

Figure 8:
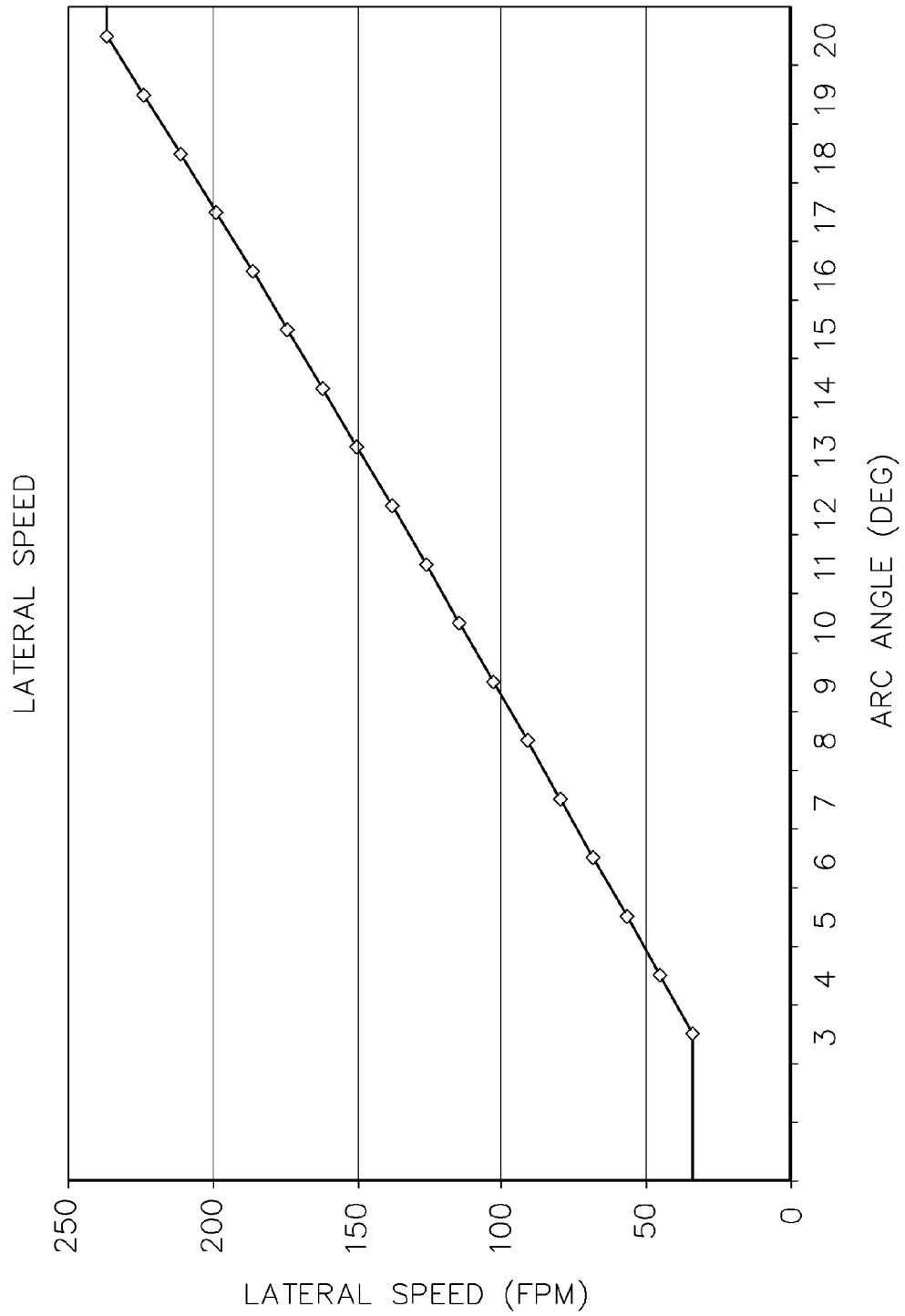
FIGS. 8-12 are graphs depicting illustrative lateral speed and lateral acceleration profiles of the pushers, leading into, within, and out of the arcuate section.
Figure 9:
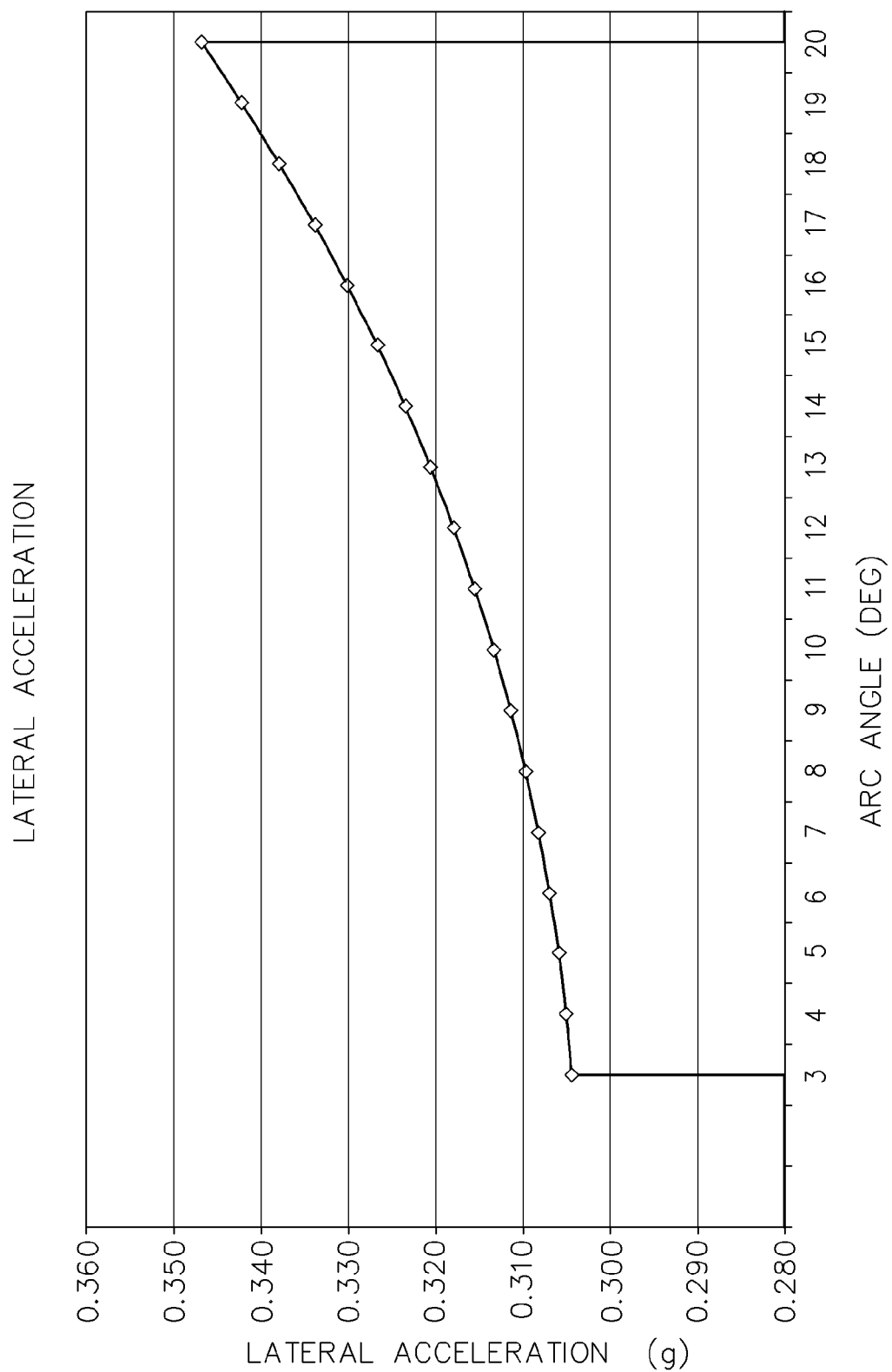
Figure 10:
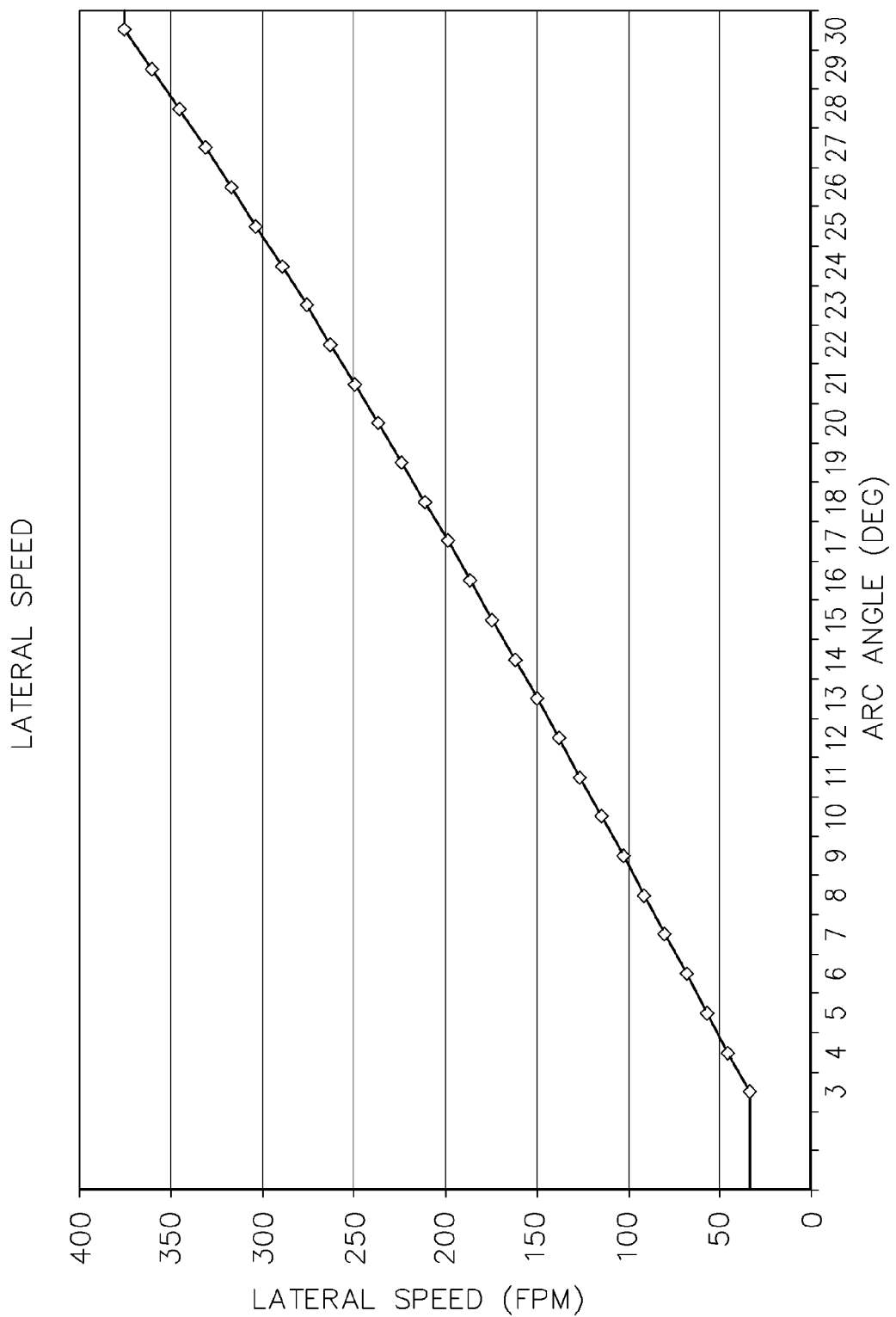
Figure 11:
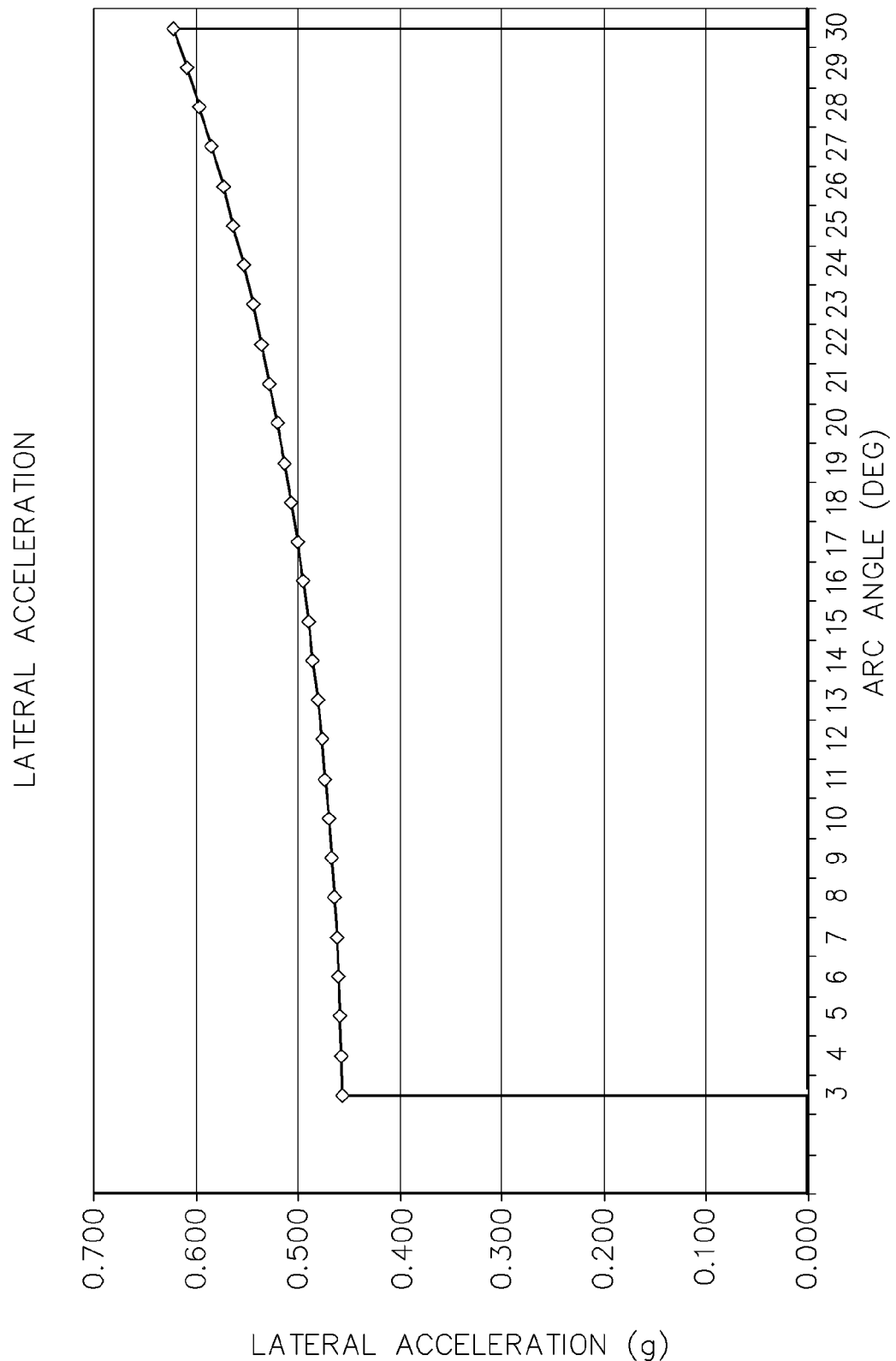

FIGS. 8 and 9 illustrate, respectively, the lateral speed and acceleration of pushers in arcuate portion 14 having a 12 foot radius, with a longitudinal speed of 650 feet per minute and a final divert angle of 20°. The values (in degrees) shown on the X axis represents the divert angle along the arcuate portion. FIGS. 8 and 9 begin at 3°, with FIG. 8 showing a short horizontal line representing the constant lateral speed of the pushers traveling along upstream straight section 18 disposed at 3°, as shown in the depicted embodiment, and with FIG. 9 showing a vertical line jumping from zero to the acceleration indicated at 3°, representing that while traveling at a constant 3° angle, there is no lateral acceleration (ignoring chatter), with lateral acceleration beginning immediately upon arcuate motion. FIGS. 8 and 9 extend up to the 20° final divert angle, where the lateral speed of the pushers traveling along section 16 after the arc is constant, indicated by the horizontal line in FIG. 8, with the lateral acceleration dropping to zero, indicated by the vertical line in FIG. 9. For simplicity of calculation, the lateral acceleration shown at each angle was determined using the change in speed divided by the time required to travel 1° arcuately prior to the whole degree indicated. Although this calculation is not the mathematical instantaneous acceleration, it is believed to be close enough for the illustrative purposes for which it is presented herein. FIGS. 10 and 11 are similar illustrations at 650 feet per minute, with an 8 foot radius and a final divert angle of 30°. Because a substantial majority of the lateral speed change of the pushers occurs after initial contact with the articles being diverted, the lateral acceleration of the articles approximates the lateral acceleration of the pushers.

It is noted that, with prior art sortation systems using straight divert guide tracks, at the point of initial contact, all of the pushers' lateral speed increase has already occurred, and the pushers contact the cartons while traveling at the highest lateral speeds shown in FIGS. 8 and 10. The high lateral speed at the time of initial contact of such prior art results in high impact forces between the carton and the pushers, limiting the ability to control cartons being diverted at high longitudinal speeds. Dealing with the sudden acceleration problem by reducing the divert angle has significant space implications, in contrast to the present invention which provides the low impact forces of significantly reduced divert angles with the space saving advantages of a high divert angle.

Figure 12:
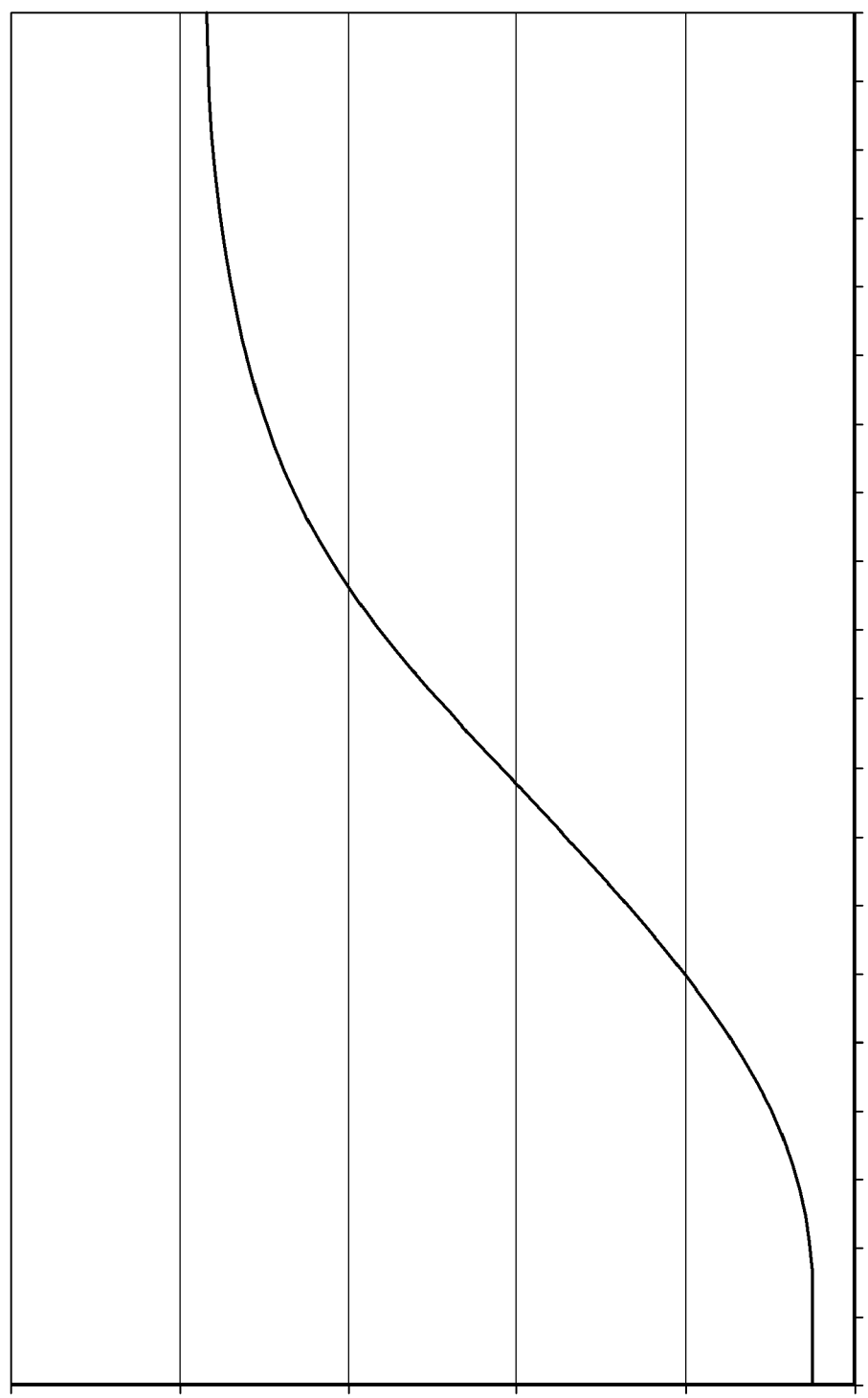

Alternatively, different speed and acceleration profiles may be utilized for carton control. Arcuate section 14 may be configured as a non-constant, multiple radii complex curve. Arcuate section 14 may be configured such that the lateral speed versus time profile is an S-ramp as illustrated in FIG. 12, starting, for example, with a low rate of increase in lateral speed followed by a higher rate and back to a lower rate when the end of the arcuate section is reached. A divert guide path configured to produce an S-ramp lateral speed profile, such as that illustrated, results in a lateral acceleration profile in which the lateral acceleration increases and then decreases.

Returning to FIG. 4, in zone F, there is a constant divert angle, 20° in the embodiment depicted, and the pushers are guided therealong. Cartons are oriented adjacent the divert surfaces of the diverted set of pushers, being diverted by the diverted set of pushers. At zone G, reentry 12 redirects the pushers from 20° to 0°. In zone H, the diverted or spent pushers are guided to travel along the diverted side of sorter 2.

Although in the depicted embodiment straight section 18 is shown as having a 3° divert angle and arcuate section 14 is shown as having a first portion with 3° divert angle, the divert angle may range from less than 20° down to less than 3°.

The present invention has been described in terms of a divert guide path which does not produce the sudden lateral acceleration or sudden angular acceleration of conveyed articles, but instead produces motion void of sudden, significant lateral acceleration. The present invention allows higher speeds and higher throughput than previously attainable due to improved carton control.

Although disclosed with a single divert guide path for an associated divert, the teachings of the present invention may be utilized in a sortation conveyor in which there is a plurality of divert guide paths for an associated divert, with each divert guide path having an associated switch. In such a configuration, articles being diverted would not necessarily be rotated upon initial contact.

The teachings of the present invention may also be practiced with less than all divert locations of a sortation conveyor configured in accordance with the teachings hereof For example, articles diverted at a particular divert location of a sortation conveyor may typically be of a configuration such that they may be diverted under control using prior sortation conveyor configurations while other divert locations need the teachings of the present invention to divert other articles diverted thereat.

Although in the depicted embodiment, the cartons are aligned near the pusher home position, near one edge of the endless conveying surface and thus the conveyor frame, with a low divert angle straight section, or as discussed above, alternatively an arcuate section, immediately downstream of the switch, the present invention may be practiced with the low divert angle straight section and/or the arcuate section disposed close to the longitudinal midline of the sortation conveyor. In such an embodiment, the switch could discharge the diverter elements directly to follow a high direct angle path, such as 20° or 30°, with the path returning to a low divert angle near the midline, leading either to a low divert angle straight section or the arcuate section with a low divert angle entrance, with the cartons aligned near the midline. Such an embodiment could be constructed, for example, by shifting straight section 18 and arcuate section 14 to/toward the midline, with a straight section leading from the switch to a reducing divert angle curve to flow into shifted straight section 18.

Although disclosed in conjunction with pushers carried by an endless conveyor, the teachings of the present invention may be utilized in a sortation conveyor with any divert element capable of diverting articles. For example, a sortation conveyor in accordance with the teachings of the present invention may include a plurality of cross belt conveyors carried by an endless conveyor. Such a cross belt conveyor could have a guiding element configured similar to the pin and cam as described herein, or other configuration performing a similar function, connected directly or indirectly to a cross belt, guided by a guide path constructed in accordance with the teachings of this invention to cause the cross belts to move in the desired direction to divert articles disposed on the cross belt conveyors.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims submitted herewith.

The invention claimed is:

1. A sortation conveyor configured to selectively divert articles at one of a plurality of divert locations, said sortation conveyor comprising:
   a. a plurality of switches associated with said plurality of divert locations;
   b. a plurality of divert guide paths, one each disposed downstream of a respective one of said plurality of switches; and
   c. each said divert guide path comprising an arcuate portion, said arcuate portion having at least one radius, said at least one radius being at least about 12 inches.

2. The sortation conveyor of claim 1, wherein said at least one radius is at least about 18 inches.

3. The sortation conveyor of claim 1, wherein said at least one radius is at least about 24 inches.

4. The sortation conveyor of claim 1, wherein said at least one radius is at least about 30 inches.

5. The sortation conveyor of claim 1, wherein said at least one radius is at least about 120 inches.

6. The sortation conveyor of claim 1, wherein said at least one radius is at least about 180 inches.

7. The sortation conveyor of any of claims 1-6, wherein said arcuate portion has a plurality of radii.

8. The sortation conveyor of any of claims 1-6, wherein said arcuate portion is a complex curve.

9. The sortation conveyor of any of claims 1-6, wherein said at least one radius comprises a plurality of radii, at least one of said radii being different.

10. The sortation conveyor of any of claims 1-6, wherein in said arcuate portion comprises a plurality of adjacent linear segments disposed non-colinear to each other.

11. The sortation conveyor of any of claims 1-6, wherein said arcuate portion is parabolic.

12. The sortation conveyor of any of claim 1-6 wherein said guide path includes a linear section disposed upstream of said arcuate portion.

13. A sortation conveyor configured to selectively divert articles at a divert location, said sortation conveyor comprising:
   a. a plurality of switches associated with said divert location, one of said switches comprising a last switch of said plurality of said switches; and
   b. a divert guide path associated with said last switch, said divert guide path comprising an arcuate portion having at least one radius, said at least one radius being at least about 12 inches.

14. The sortation conveyor of claim 13, wherein said at least one radius is at least about 18 inches.

15. The sortation conveyor of claim 13, wherein said at least one radius is at least about 24 inches.

16. The sortation conveyor of claim 13, wherein said at least one radius is at least about 30 inches.

17. The sortation conveyor of claim 13, wherein said at least one radius is at least about 120 inches.

18. The sortation conveyor of claim 13, wherein said at least one radius is at least about 180 inches.

* * * * *